United States Patent [19]

Zetherstrom et al.

[11] 4,172,153

[45] Oct. 23, 1979

[54] PRODUCT WITH IMPROVED STABILITY

[75] Inventors: Lars B. Zetherström, Billdal; Håkan P. Brandt, Särö, both of Sweden

[73] Assignee: Extraco AB, Klippan, Sweden

[21] Appl. No.: 870,795

[22] Filed: Jan. 19, 1978

[30] Foreign Application Priority Data

Jan. 26, 1977 [SE] Sweden .............................. 7700821

[51] Int. Cl.$^2$ .............................................. A23B 4/08
[52] U.S. Cl. ...................................... 426/332; 426/643; 426/327
[58] Field of Search ................. 426/32, 327, 332, 643, 426/652, 524

[56] References Cited

U.S. PATENT DOCUMENTS

| | | | |
|---|---|---|---|
| 3,881,032 | 4/1975 | Matsumoto et al. | 426/327 X |
| 3,922,372 | 11/1975 | Hasegawa | 426/643 X |
| 3,955,011 | 5/1976 | Niki et al. | 426/643 |
| 3,959,517 | 5/1976 | Niki et al. | 426/643 |
| 4,062,409 | 12/1977 | Niki et al. | 426/643 |

FOREIGN PATENT DOCUMENTS

5034618 10/1969 Japan .

*Primary Examiner*—Robert A. Yoncoskie
*Attorney, Agent, or Firm*—Fred Philpitt

[57] ABSTRACT

The present invention relates to minced fish having improved stability during frozen storage and to a method of preparing such minced fish which comprises incorporating a gelatin hydrolysate into said minced fish.

6 Claims, No Drawings

PRODUCT WITH IMPROVED STABILITY

BACKGROUND

Minced fish flesh is used for products such as fish balls and fish sausages. On an industrial scale minced fish is prepared either by mincing fillets or fish flesh obtained from beheaded and gutted fish from which the flesh has been separated from skin and bones in special separators whereby an increased yield of fish flesh is obtained. After cutting of fillets the remaining carcasses contain about 10 to 15 percent by weight of the total amount of the flesh and these can of course also be processed in the separating machines. Minced flesh from fillets has a comparatively good stability during frozen storage while fish mince prepared by utilization of skin and bone separators, hereinafter referred to as whole fish mince, from fish such as for example cod and haddock, has the disadvantage that it cannot be frozen and stored for later use without special treatment or without additives. This is due to the fact that some residues of the internal organs, such as kidney tissue, remain after gutting and these will be mixed into the minced fish flesh when skin and bone separators are used. Enzymes in these organs decompose trimethylamine oxide to formaldehyde, among other things. Formaldehyde reacts with fish protein, crosslinks the protein and changes its functional properties, such as its water-holding capacity, which in turn cause texture changes to such an extent that the minched fish flesh can e.g. not be used for the production of fish balls. This transformation of the protein is not prevented by freezing.

A number of chemical substances have been tried in order to improve the stability of minced fish during frozen storage. The objective has been to find chemical freezing stabilizers that do not cause changes of the taste, odor or texture of the minced fish. When used for whole fish mince they must prevent protein transformation for a long enough time that frozen storage is feasible. As examples of substances that have been tried as additives for freezing and storage can be mentioned polyphosphates, sorbitol, glycerol and amino acids. Of these substances only sugar and glycerols give freezing protection over a long period of time, but they have the disadvantage of conferring an undesirably sweet taste to the fish mince. Amino acids along give a bitter taste and attempts have been made to compensate this by using a combination of amino acids and sugars.

THE PRESENT INVENTION

We have discovered that the frozen storage stability of fish mince can be improved in mixing gelatin hydrolysate with the fish mince. The addition of gelatin hydrolysate does not cause changes of the taste or odor of the comminuted fish flesh. Whole fish mince containing gelatin hydrolysate can be frozen and stored for longer periods of time without changes of either the fish protein or its texture.

The amount of gelatin hydrolysate that should be added to the fish mince in order to achieve frozen stability can readily be determined by simple trial and error tests. The amount of gelatin hydrolysate that should be incorporated in the minced fish depends both on the original quality of the fish mince and the length of time the minced fish is to remain frozen. Amounts of gelatin hydrolysate as low as 0.5 percent by weight based on the weight of the fish mince can be used, but generally the fish mince should contain gelatin hydrolysate in an amount exceeding 1.5 percent by weight in order to maintain stability for a long period under frozen storage. The upper limit of the gelatin hydrolysate which can be added is not critical but is primarily dictated by economic considerations. Too high an amount of gelatin hydrolysate can sometimes have a negative influence on the structure and the rheological properties of products made from the mince. We have found that most minced fish should contain from about 2 to 8 percent by weight of gelatin hydrolysate based on the mince and preferably about 3 to 6 percent by weight.

Gelatin hydrolysate improves the frozen storage stability of minced fish from fillets but since such mince has rather good stability without additives, the present invention is primarily utilized with whole fish mince. Whole fish mince according to the present invention can be freeze stored for long periods of time without protein changes.

Tests have shown that gelatin as such does not give a good freezing protection effect. Products prepared from frozen fish mince containing gelatin were not acceptable while products prepared from frozen fish mince containing gelatin hydrolysate had an acceptable consistency and were free from undesirable flavors. Gelatin is usually defined by its Bloom-number which is a measure of the gel strength. Gelatin generally has a Bloom-number within the range of 80 to 300. By alkaline, acid or enzymatic hydrolysis the gelatin can be degraded to shorter peptide chains and also to free amino acids. Gelatin hydrolysate is generally defined as gelatin or collagen which has been degraded to such an extent that it has lost its gel forming properties, so called "O-Bloom gelatin". The lower limit for the degree of hydrolysis is not critical, but a bitter taste may occur if the hydrolysis is carried too far. (Bloom tests were carried out according to British Standard No. 757:1975.)

The invention is further illustrated in the following examples which, however, are not intended to limit the same.

EXAMPLE 5 percent by weight of a gelatin hydrolysate was mixed into a whole fish mince from white fish (cod and haddock) and the mince was frozen in a tunnel freezer. The minced fish was then stored at −20° C. and samples were taken out for the preparation of fish balls after 3, 6 and 9 weeks respectively.

Fish balls were prepared according to the following base recipe.

| Ingredient | Amount % by weight |
| --- | --- |
| Whole minced fish | 56 |
| Water + ice | 32 |
| Salt | 2 |
| Potato flour | 7 |
| Soy oil | 3 |

After the preparation sensory analysis of the fish balls was carried out. The subjective total evaluation included i.a. consistency, structure and the appearance of the surface of the fish balls, the nature of the sterilization liquor, etc. As an objective determination of the texture the force required for compressing a fish meat ball was measured with an Instron Universal Testing Machine. The deformation force may vary within the range of 0.5 to 3.5 kp if the texture is to be considered acceptable. Comparisons were made with fish balls prepared from whole fish mince frozen and stored in the same manner (a) without additives and (b) with added gelatin. The results are shown in the table below.

TABLE

| | STORAGE TIME | | | | | |
|---|---|---|---|---|---|---|
| | 3 weeks | | 6 weeks | | 9 weeks | |
| | Sensory evaluation | Deformation force kp | Sensory evaluation | Deformation force kp | Sensory evaluation | Deformation force kp |
| Whole fish mince + 5% gelatin hydrolysate | Acceptable | 1.10 | Acceptable | 1.10 | Acceptable | 0.70 |
| Whole fish mince without additives | Not acceptable | 0.80 | not "balls" | — | not "balls" | — |
| Whole fish mince + 5% gelatin | Not acceptable | 0.80 | Not acceptable | 0.70 | not "balls" | — |

[1](The term — not "balls" — means that fish balls could not be formed from the mince because it was too soft, almost flowing.)
[2](The term — "not acceptable" was used for fish balls which were not acceptable with respect to consistency, structure and appearance. The main objections were that the surface of the balls was uneven, that the balls were grainy and that small parts of the balls had come loose and were present in the sterilization liquor.)

We claim:

1. Minced fish meat having improved stability to protein changes during frozen storage, said minced fish meat containing at least 0.5 percent by weight, based on the minced meat, of a gelatin hydrolysate, said gelatin hydrolysate being collagen or gelatin that have been hydrolysed to such an extent that the gel-forming properties have been lost.

2. Minced fish meat according to claim 1, which contains gelatin hydrolysate in an amount exceeding 1.5 percent by weight based on the minced meat.

3. Minced fish meat according to claim 1 wherein the minced fish meat is whole minced meat that has been prepared by utilization of skin and bone separators.

4. A method of preparing minced fish meat having improved stability to protein changes during frozen storage comprising mixing into minced fish meat at least 0.5 percent by weight based on the minced meat of a gelatin hydrolysate, said gelatin hydrolysate being collagen or gelatin that have been hydrolysed to such an extent that the gel-forming properties have been lost.

5. A method according to claim 4 wherein the gelatin hydrolysate is mixed into the minced fish meat in an amount exceeding 1.5 percent by weight based on the minced meat.

6. A method according to claim 4 wherein the minced fish meat is whole minced meat that has been prepared by utilization of skin and bone separators.

* * * * *